US012623863B2

(12) United States Patent
Kale et al.

(10) Patent No.: US 12,623,863 B2
(45) Date of Patent: May 12, 2026

(54) AUTOMATICALLY DETECTING OR ESTIMATING MATERIAL DELIVERY DELAYS AND MACHINE CONTROL

(71) Applicant: Deere & Company, Moline, IL (US)

(72) Inventors: Mandar Mhalsakant Kale, Pune (IN); William D. Graham, East Moline, IL (US); Omkar P. Joshi, Moline, IL (US); Venkata Nagendra Pavan Kumar Nerellakunta, Moline, IL (US)

(73) Assignee: Deere & Company, Moline, IL (US)

( * ) Notice: Subject to any disclaimer, the term of this patent is extended or adjusted under 35 U.S.C. 154(b) by 613 days.

(21) Appl. No.: 18/171,770

(22) Filed: Feb. 21, 2023

(65) Prior Publication Data

US 2024/0279005 A1 Aug. 22, 2024

(51) Int. Cl.
*B65G 53/66* (2006.01)
*A01C 15/00* (2006.01)
*A01C 15/04* (2006.01)

(52) U.S. Cl.
CPC ............ *B65G 53/66* (2013.01); *A01C 15/005* (2013.01); *A01C 15/04* (2013.01); *B65G 2203/0233* (2013.01)

(58) Field of Classification Search
CPC ........ B65G 53/66; B65G 53/34; B65G 53/00; B65G 2203/0233; B65G 2203/0208; B65G 2203/00; A01C 15/005; A01C 15/00; A01C 15/04
See application file for complete search history.

(56) References Cited

U.S. PATENT DOCUMENTS

| | | | |
|---|---|---|---|
| 9,788,479 | B2 | 10/2017 | Kinch et al. |
| 9,955,625 | B2 | 5/2018 | Baurer et al. |
| 2011/0035163 | A1 | 2/2011 | Landphair |
| 2015/0271989 | A1 | 10/2015 | Kinch et al. |
| 2018/0014457 | A1 | 1/2018 | Mertlich et al. |
| 2021/0337719 | A1 | 11/2021 | Schmidt et al. |

FOREIGN PATENT DOCUMENTS

| | | |
|---|---|---|
| DE | 3826397 A1 | 1/1989 |
| EP | 3100603 A1 | 12/2016 |

OTHER PUBLICATIONS

Extended European Search Report and Written Opinion issued in European Patent Application No. 24155377.5, dated Jul. 15, 2024, in 09 pages.

*Primary Examiner* — Christopher J. Novosad

(74) *Attorney, Agent, or Firm* — Christopher J. Volkmann; KELLY, HOLT & CHRISTENSON PLLC

(57) ABSTRACT

Material is metered by a meter into a delivery conduit from a tank and delivered to a tool on an agricultural machine. A sensor detects when the material arrives at the tool. A delay time is detected between when the meter is activated and when the sensor detects the material. The agricultural machine is controlled based on the delay time.

18 Claims, 15 Drawing Sheets

FROM TANK 166

FROM TANK 164

FROM TANK 162

172

170

168

173

132

AUTOMATICALLY DETECTING OR ESTIMATING MATERIAL DELIVERY DELAYS AND MACHINE CONTROL

FIELD OF THE DESCRIPTION

The present description relates to agricultural equipment. More specifically, the present description relates to a system that detects and processes material application delays on an agricultural machine.

BACKGROUND

There are a wide variety of different types of agricultural equipment that can be used to plant seeds or apply other commodities to a field. Such equipment can include air seeders. Air seeders have an air cart with one or more central seed or commodity tanks. The seed or commodity in the tank is metered by a metering system into common product delivery tubes called "primaries". The seed or commodity is delivered (using air delivery) to a tool for disbursement. The tool disburses the product into secondary tubes which deliver the product to individual furrows opened by the tool. The furrows are opened by a furrow opener and closed after seed is delivered to the furrow by a closer.

There may be multiple tanks and multiple metering systems so the distance that the material travels from the different tanks to the tool may be different. Also, the length of the secondary tubes can also be different because the secondary tubes deliver the product across the width of the tool.

The discussion above is merely provided for general background information and is not intended to be used as an aid in determining the scope of the claimed subject matter.

SUMMARY

Material is metered by a meter into a delivery conduit from a tank and delivered to a tool on an agricultural machine. A sensor detects when the material arrives at the tool. A delay time is detected between when the meter is activated and when the sensor detects the material. The agricultural machine is controlled based on the delay time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
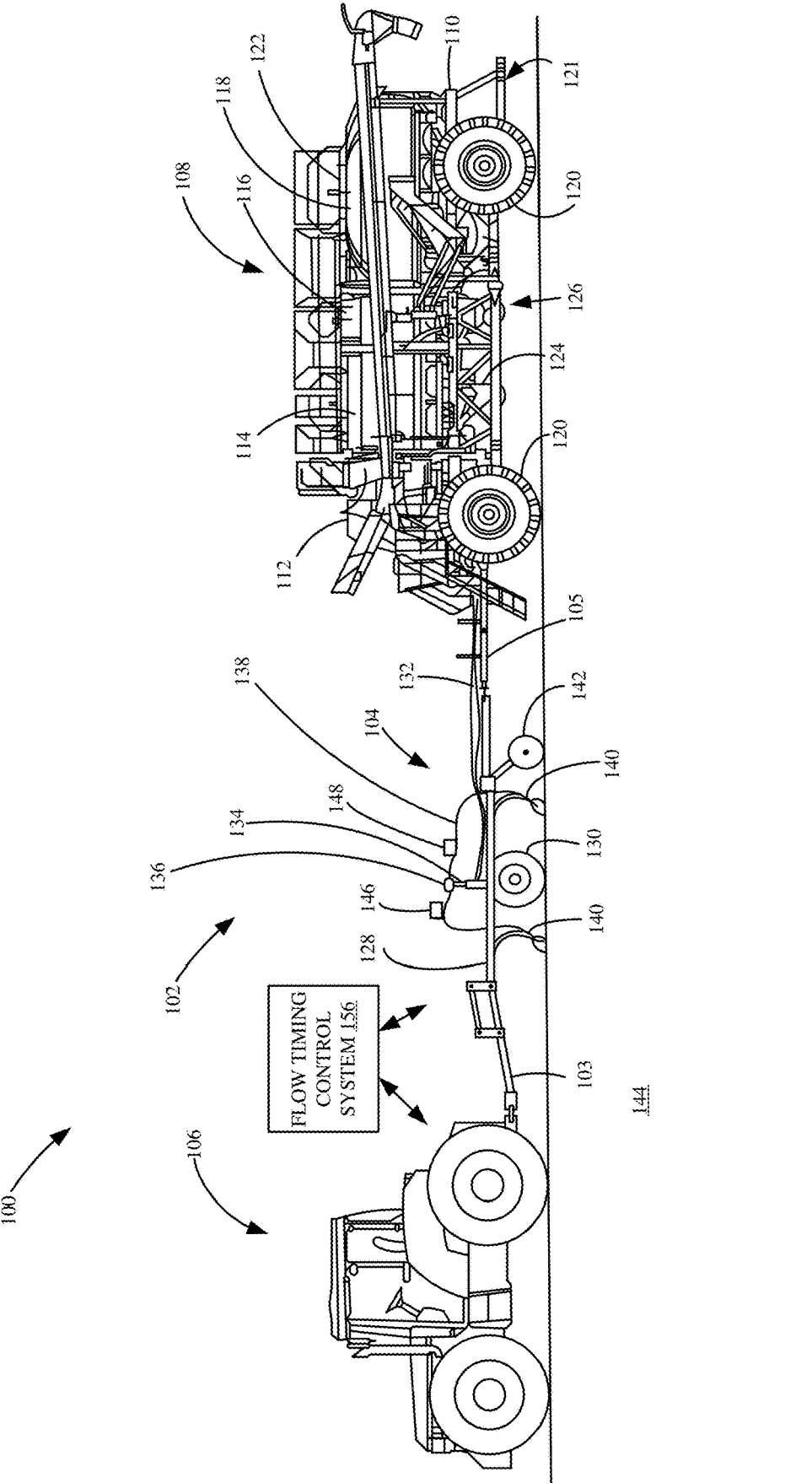
FIG. 1 is a partial pictorial, partial block diagram illustrating an agricultural system in which an air seeder is towed by a tractor.

As discussed above, air seeders have an air cart with one or more tanks that hold material to be delivered to the field. The air cart also has a metering system corresponding to each tank. The metering system meters material from the corresponding tank into a primary delivery tube and a fan blows air through that tube in order to move the material through the primary delivery tube to a seeding tool. The seeding tool receives material from the primary delivery tube and disperse the material into a plurality of secondary delivery tubes. Each secondary delivery tube delivers material to a particular furrow that is opened by a furrow opener on the tool. After the material is placed in the furrow, the furrow can be closed by a furrow closer on the tool.

Some current systems include a sensor on the secondary tubes on the seeding tool in order to determine whether any material is passing through that secondary delivery tube. If material is not detected by the sensor, then the sensor generates a signal indicative of a blockage somewhere upstream of the sensor.

As discussed above, the air cart may have multiple different tanks carrying one or more different types of material. The tanks are spaced relative to one another along a longitudinal (front-to-back) axis of the air cart. Each tank often has a corresponding meter that meters the product from the tank into the primary delivery tubes. Therefore, the distance that the material travels from one tank to the seeding tool is different from the distance the material must travel from another tank to the seeding tool. Further, the primary delivery tubes are often different lengths relative to one another because those conduits each deliver the metered product from the tanks to a distributing point (e.g., a distribution manifold discussed below). The distribution manifolds are spaced along the transverse width of the seeding tool. Therefore, the length of the primary delivery tubes differs, depending on where the corresponding distribution manifold is located along the transverse width of the seeding tool. The secondary delivery lines may also have different lengths. Controlling material application can thus be difficult because it takes a different amount of time for material to reach the furrows, depending on where the material is coming from and depending on where the distribution manifold and furrow opener are located along the width of the seeding tool, For instance, when an air seeder is approaching a headland turn, the air seeder is often controlled to stop applying seeds so that the end rows are not over-seeded. Similarly, the air seeder can be controlled using section control techniques in which sections of the air seeder are turned on or off independently of one another in order to avoid over-seeding or skips. However, in order to accurately control the application of material, the delay between when a meter is turned on and when the material reaches the furrow (the turn on delay), and the delay between when a meter is turned off and when material stops reaching the furrow (the turn off delay), are to be considered.

In some current systems, in order to try to identify the delays, an operator exits the operator compartment and stands adjacent the seeding tool on the air seeder while the meters are turned on and off. The operator uses a stopwatch (or other manually controlled timing device) in an attempt to measure the turn on delay and turn off delay. The flow timing values (the turn on delay values and the turn off delay values) are then manually entered by the operator into the control system of the air seeder in order to accomplish more accurate control of the material application process (e.g., the process of seeding, applying fertilizer, applying herbicide or other commodities).

This method still present problems. For instance, the flow timing values will vary based upon the speed of the blower that is carrying the material from the tanks to the seeding tool. Also, the delays will vary across the transverse width of the seeding tool. Thus, in order to obtain accurate flow timing values, the operator must perform the manual timing detection at multiple different locations across the transverse width of the seeding tool, and using multiple different blower speeds. Further, different materials have different densities. Therefore, the flow timing values may vary, depending upon the particular material being applied. Thus, using the manual detection method, the operator must also perform multiple different operations at different locations along the seeding tool, using different blower speeds, and also using different materials. This is a cumbersome and error prone way of identifying the flow timing values.

Thus, this often results in over-application of material, or under-application of material. These are both undesirable. Over-seeding, for instance, can result in wasted product while under-seeding can result in lower yield per acre than the field could otherwise support. Over-application of fertilizer, for instance, can result in damage to the plant, while under-application can reduce the efficacy of the application.

The present discussion thus proceeds with respect to an agricultural system in which an agricultural machine has one or more sensors on the seeding tool that sense whether product is flowing from the air cart to the sensor and generate a sensor signal indicative of this. The flow timing values (e.g., the turn on delay or other values) are detected by activating a meter and detecting the amount of time it takes for product to flow from the meter to the sensor, based on the sensor signal. The flow timing values (e.g., the turn off delay or other values) can also be calculated by deactivating the meter and detecting the time that it takes for the material to stop reaching the sensor after the meter is deactivated. This process can be performed automatically, using different sensors disposed across the seeding tool, using different meters, with different materials, and at different blower speeds. The flow timing values can then be stored and used in controlling the agricultural machine, such as in turning the flow of material on and off as the machine approaches and departs headland turns, waterways, or other obstacles, in performing section control, in performing blockage detection, or in performing a wide variety of other control operations.

In another example, the length of the delivery conduits as well as the density of material and the blower speeds are manually entered. The present system automatically generates flow timing value estimates which are stored for use in controlling the machine. The flow timing value estimates can be updated based upon manually measured values, based upon operator observation, or in other ways. By automatically it is meant, in one example, that the function or operation is performed without further human involvement except, perhaps, to initiate and/or authorize the function or operation.

FIG. 1 is a side view of an example of an agricultural system 100 which includes an agricultural implement, in particular an air or pneumatic seeder 102. In the example shown in FIG. 1, the seeder 102 comprises a tilling implement (also referred to as a material application implement or drill or seeding tool) 104 towed between a tractor (or other towing vehicle) 106 and a commodity cart (also sometimes called an air cart) 108. The commodity cart 108 has a frame upon which a series of product tanks 112, 114, 116, and 118, and wheels 120 are mounted. There may be one or more tanks and four tanks are shown in FIG. 1 as an example only. Each product tank has a door (a representative door 122 is labeled) releasably sealing an opening at the upper end of the tank for filling the tank with product, most usually seed or a commodity of one type or another. A metering system 124 is provided at a lower end of each tank (a representative one of which is labeled in FIG. 1 and others are shown and described elsewhere herein) for controlled feeding or draining of product (most typically granular material) into a pneumatic distribution or delivery system 126. The tanks 112, 114, 116, and 118 can hold, for example, a material or commodity such as seed or fertilizer to be distributed to the soil. The tanks can be hoppers, bins, boxes, containers, etc. The term "tank" shall be broadly construed herein. Furthermore, one tank with multiple compartments can also be provided instead of separate tanks.

The seeding tool 104 includes a frame 128 supported by ground engaging wheels 130. Frame 128 is connected to a leading portion of the commodity cart 108, for example by a tongue style attachment (not labeled). The commodity cart 108 as shown is sometimes called a "tow behind cart," meaning that the cart 108 follows the seeding tool 104. In an alternative arrangement, the cart 108 can be configured as a "tow between cart," meaning the cart 108 is between the tractor 106 and seeding tool 104. In yet a further possible arrangement, the commodity cart 108 and seeding tool 104 can be combined to form a unified rather than separated configuration. These are just examples of additional possible configurations. Other configurations are even possible and all configurations should be considered contemplated and within the scope of the present description.

In the example shown in FIG. 1, tractor 106 is coupled by couplings 103 to seeding tool 104 which is coupled by couplings 105 to commodity cart 108. The couplings 103 and 105 can be mechanical, hydraulic, pneumatic, and electrical couplings, and/or other couplings. The couplings 103 and 105 can include wired and wireless couplings as well.

The pneumatic distribution system 126 includes one or more fans or blowers located generally at 121 connected to a product delivery conduit structure having multiple product flow passages 132 referred to as primary delivery tubes 132. The fan directs air through the primary delivery tubes 132. Each product metering system 124 controls delivery of product from its associated tank at a controllable rate to the transporting airstreams moving through primary delivery tubes 132. In this manner, each flow passage defined by each primary delivery tube 132 carries product from one or more of the tanks to a secondary distribution tower 134 on the seeding tool 104. Typically, there will be one tower 134 for each primary delivery tube 132. Each tower 134 includes a secondary distributing manifold 136, typically located at the top of a vertical tube. The secondary distributing manifold

136 divides the flow of product into a number of secondary distribution tubes 138. Each secondary distribution tube 138 delivers product to one of a plurality of ground engaging tools 140 (also known as ground openers or furrow openers) that define the locations of work points on seeding tool 104. The ground engaging tools (or furrow openers) 140 open a furrow in the soil 144 and facilitate deposit of the product therein. The number of primary delivery tubes 132 that feed into secondary distribution may vary from one to eight or ten or more, depending at least upon the configuration of the commodity cart 108 and seeding tool 104. Depending upon the cart and implement, there may be two distribution manifolds 136 in the air stream between the meters 124 and the ground engaging tools 140. Alternatively, in some configurations, the product is metered directly from the tank or tanks into secondary distribution lines that lead to the ground engaging tools 140 without any need for an intermediate distribution manifold. The product metering system 124 can be configured to vary the rate of delivery of seed or other material to each work point on seeding tool 104 or to different sets or zones or sections of work points on tilling implement 104. The configurations described herein are only examples. Other configurations are possible and should be considered contemplated and within the scope of the present description.

A firming or closing wheel 142 associated with each ground engaging tool 140 trails the tool and firms the soil over the product deposited in the soil. In practice, a variety of different types of tools 140 are used including, but not necessarily limited to, tines, shanks and disks. The tools 140 are typically moveable between a lowered position engaging the ground and a raised position riding above the ground. Each individual tool 140 may be configured to be raised by a separate actuator. Alternatively, multiple tools 140 (or sections of tools) may be mounted to a common component for movement together. In yet another alternative, the tools 140 may be fixed to the frame 128, the frame being configured to be raised and lowered with the tools 140.

Examples of air or pneumatic seeder 102 described above should not be considered limiting. The features described in the present description can be applied to any seeder configuration, or other material application machine or material application implement, whether specifically described herein or not.

FIG. 1 also shows that agricultural system 100 includes one or more material sensors. In the example in FIG. 1, the material sensors are labelled 146, and 148, although more or fewer material sensors can be used. Material sensors 146 and 148 are disposed within different secondary distribution lines 138 and sense whether material (e.g., seed or other commodity) is flowing through the secondary distribution lines 138 to which the material sensor is mounted. FIG. shows that agricultural system 100 can also include flow timing control system 156. Flow timing control system 156 receives and processes signals from the material sensors 146-148 and generates an output based on the processed signals. The output can identify a flow timing characteristic such as the turn on delay which represents a delay between when one of the meters in metering system is turned on and when material from that meter is detected by one or more of the material sensors 146-148. The flow timing characteristics can also be a turn off delay which represents a delay between when a meter is turned off and when the material sensors 146-148 no longer sense material. Control system 156 is described in greater detail elsewhere herein.

Also, it will be appreciated, that different portions of system 156 can reside on tractor 106, on tool or implement 104, and/or on air cart 108, or all of the elements of system 156 can be located at one place (e.g., on tractor 106). Elements of system 156 can be distributed to a remote server architecture or located or distributed in other ways as well.

Sensors 146-148 can be optical sensors or any of a wide variety of other types of sensors. By way of example, sensors 146-148 can generate acoustic signals indicative of the acoustic pattern or signature or indicative of the vibration pattern or signature of material traveling through the secondary distribution lines 138, to which sensors 146-148 are mounted. In one example, the acoustic signature or vibration pattern of the material will be different depending on the quantity of material and the type of material traveling through the secondary distribution line. Therefore, in one example, control system 156 can use machine learning (e.g., artificial intelligence, an artificial neural network, a convolutional neural network, etc.) or other processing to process the sensor signals generated by sensors 146-148 and identify the quantity and types of material traveling through the secondary distribution lines 138 based on the acoustic pattern or signature or vibration pattern or signature.

Assume, for instance, that one of the secondary distribution lines 138 receives material from two different tanks 114 and 116, that are both metered into a single primary distribution tube 132. In that case, it may be desirable to identify flow timing values for both of the tanks 116 and 118. By processing the acoustic signatures generated by sensors 146-148, and the timing of turning on and off the different meters, control system 156 can determine what types of material are flowing through the corresponding secondary distribution tubes 138, and the quantity of each material and thus determine the flow timing values for multiple different tank/meter/material sensor contributions. Of course, this is just one example. The flow timing values for each meter can also be identified by turning on and off each meter separately and detecting the flow timing values in that way, without using a machine learning system.

Figure 2:
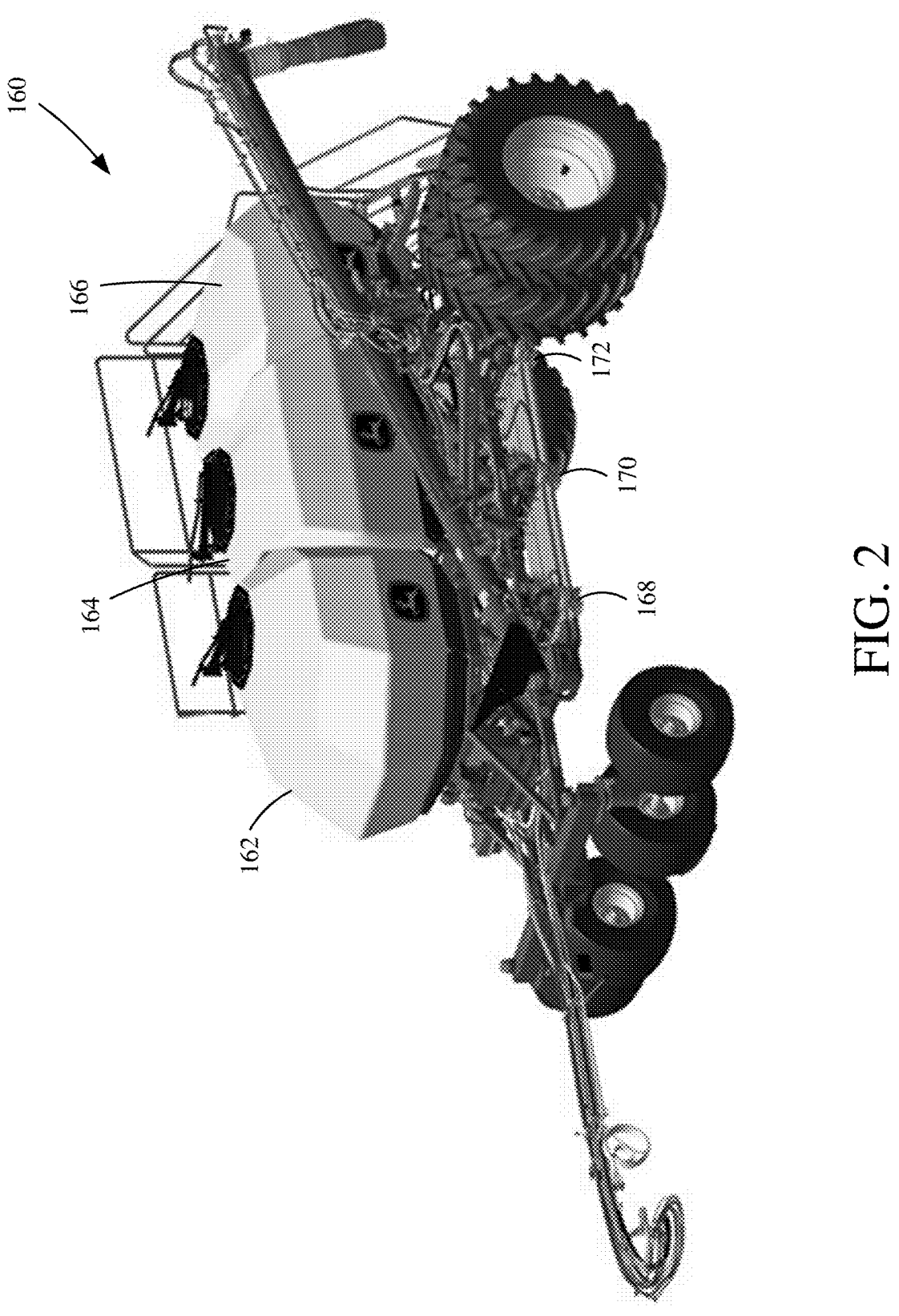
FIG. 2 is a perspective view of an air cart.

FIG. 2 is a pictorial illustration of another example of an air cart 160. Air cart 160 is similar to air cart 108, except that air cart 160 has three tanks 162, 164, and 166. Each tank has a corresponding metering system 168, 170, and 172 that meters material from the corresponding tanks into one or more of the primary delivery tubes 132.

Figure 3:
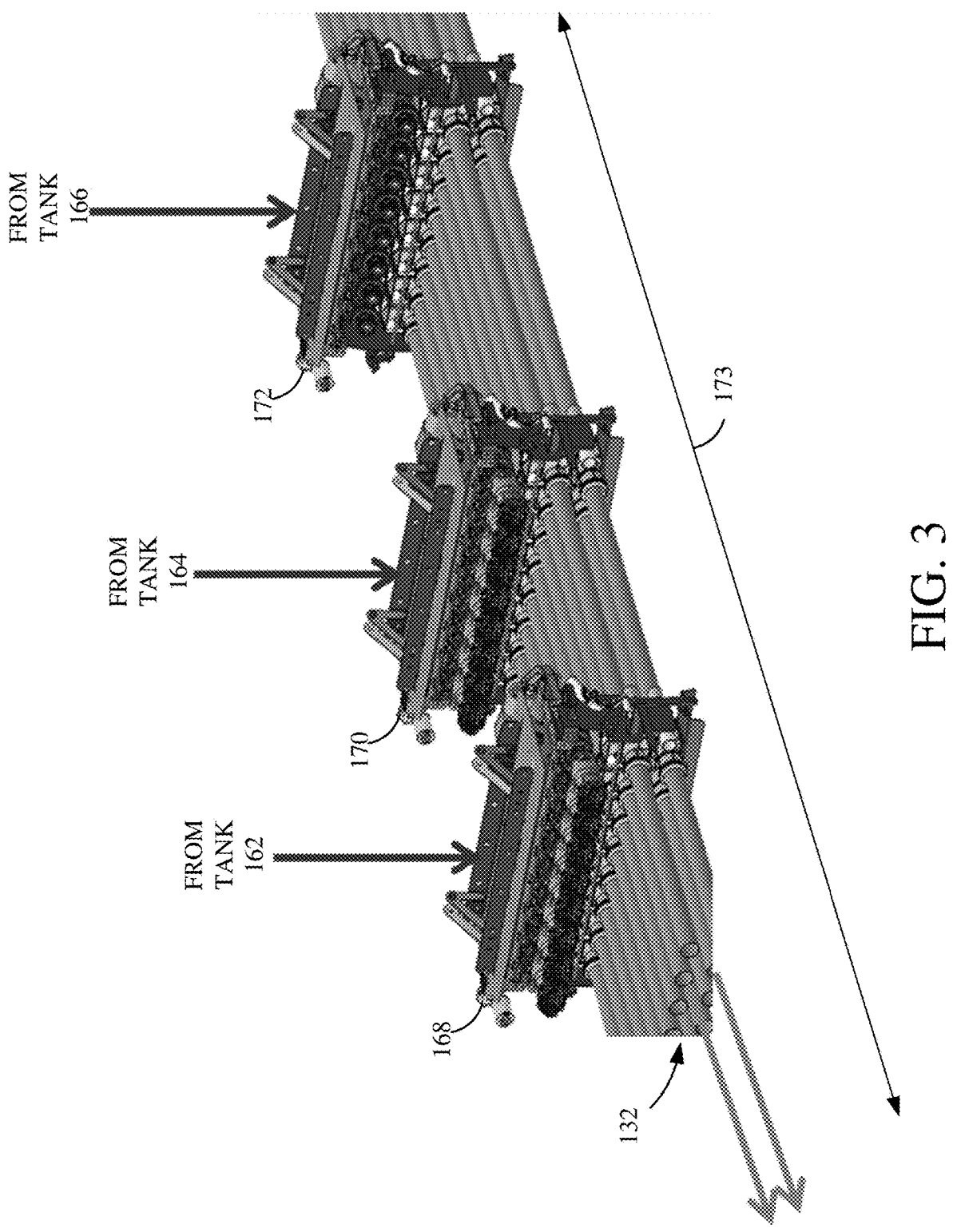
FIG. 3 is perspective view of metering devices and primary delivery tubes.

FIG. 3 shows a portion of air cart 160 with the tanks, wheels, and other portions removed, to show metering systems 168, 170, and 172 more clearly. FIG. 3 shows that material from tank 162 is metered by meter 168 into one or more of the primary delivery tubes 132 (not shown in FIG. 3). Similarly, material from tank 164 is metered by metering system 170 into the primary delivery tubes 132, and material from tank 166 is metered by metering system 172 into the primary delivery tubes 132. Any number N of metering systems can meter any number of different materials into the same primary delivery tube 132. Therefore, the primary delivery tubes may carry a single type of material, or a plurality of different types of material. It will also be noted that the tanks and corresponding meters 168, 170, and 172 are spaced relative to one another along a longitudinal axis of air cart 160 that is generally parallel to line 173 in FIG. 3.

Figure 4:
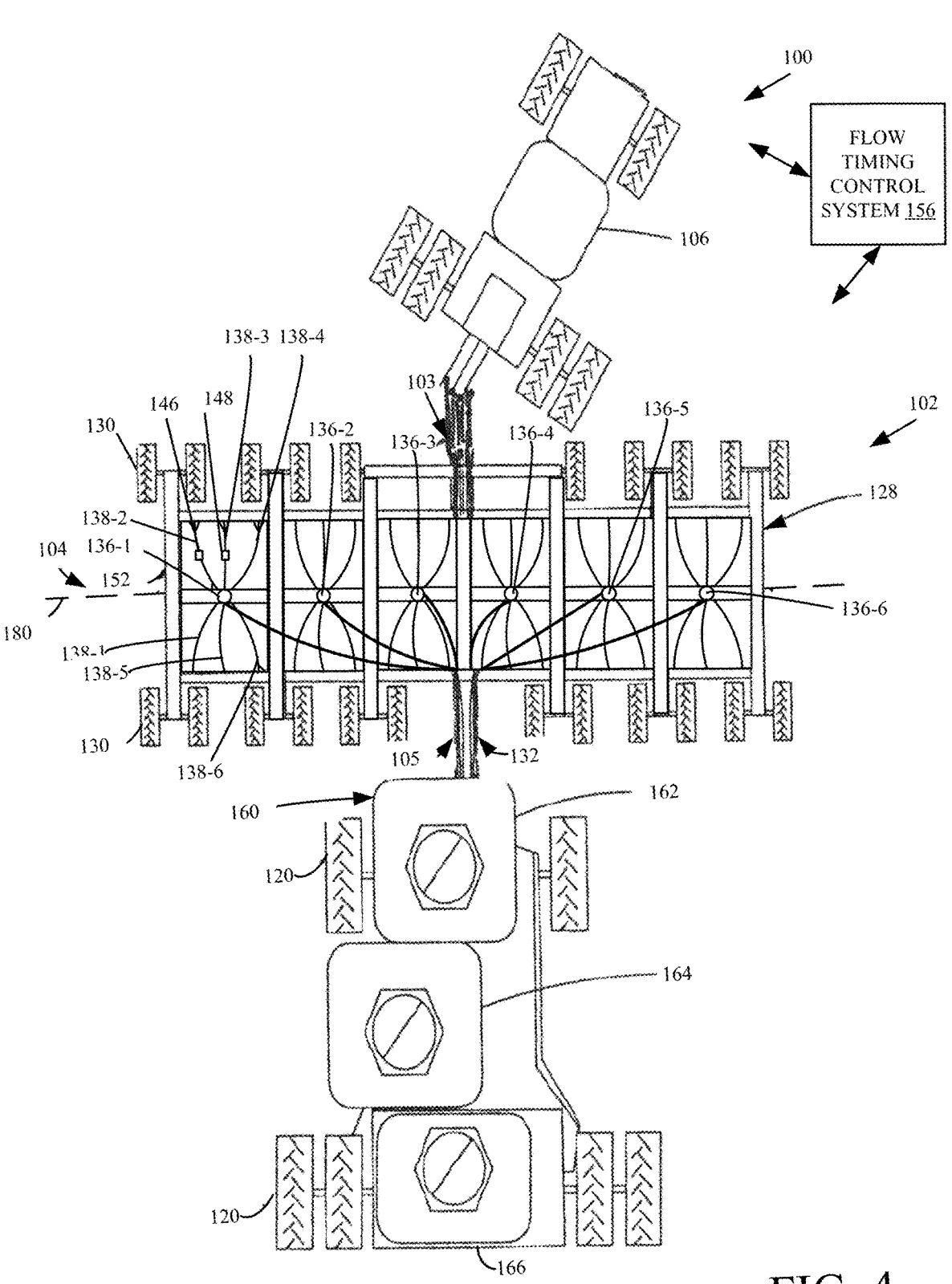
FIG. 4 is a top view of the agricultural system.

FIG. 4 is top view of agricultural system 100, in which some items are similar to those shown in FIG. 1 and are similarly numbered. FIG. 4 shows that seeding tool 104 has a plurality of work points that may be distributed along a transverse axis 180 of seeding tool 104. In the example shown in FIG. 4, a plurality of secondary distributing manifolds (labeled 136-1 to 136-6) are mounted to the frame 128 of seeding tool 104. Each of the secondary distributing manifolds 136-1 to 136-6 receives material through a primary delivery tube 132 and distributes that material into the secondary delivery lines 138. Each of the secondary distributing manifolds 136-1 through 136-6 shown in FIG. 4 have six secondary distributing lines 138 that take product to a separate work point. In the example shown in FIG. 4, the work points correspond to a separate ground engaging tool 140 that is mounted to frame 128 and that opens a furrow in the ground over which seeding tool 104 is traveling. In the example shown in FIG. 4, only the secondary delivery lines 138-1 through 138-6 that are coupled to secondary distributing manifold 136-1 are numbered. The other secondary delivery lines 138 connected between distributing manifolds 136-2 through 136-6 and the other work points on tilling implement 104 are not labeled, for the sake of simplicity only. Also, as shown in FIG. 4, one or more of the secondary delivery lines 138 have a sensor 146-148 coupled thereto. In one example, all of the secondary delivery lines 138 have a separate sensor 146-148 connected thereto. In the example shown in FIG. 4, only sensors 146 and 148 coupled to secondary delivery lines 138-2 and 138-3 are labeled. Again, this is for the sake of simplicity but it is assumed that in one example, sensors may be connected to one or any other number of secondary delivery lines 138 up to and including all of the secondary delivery lines 138.

In one example, each of the secondary distributing manifolds 136-1 through 136-6 corresponds to a different, independently controllable, section of work points (or section of ground engaging tools 140). In another example, a different number (e.g., two or more) of secondary distributing manifolds 136-1 through 136-6 corresponds to a section of seeding tool 104. In those examples, the meters feeding the secondary distributing manifolds can be individually controlled to accomplish section control, in which some secondary distributing manifolds 136-1 through 136-6 are actively distributing material received through a corresponding primary delivery tube 132, while other distributing manifolds 136-1 to 136-6 are not distributing material. Thus, seeding can be accomplished with some sections active of the seeding tool 104 and other sections inactive.

Figure 5:
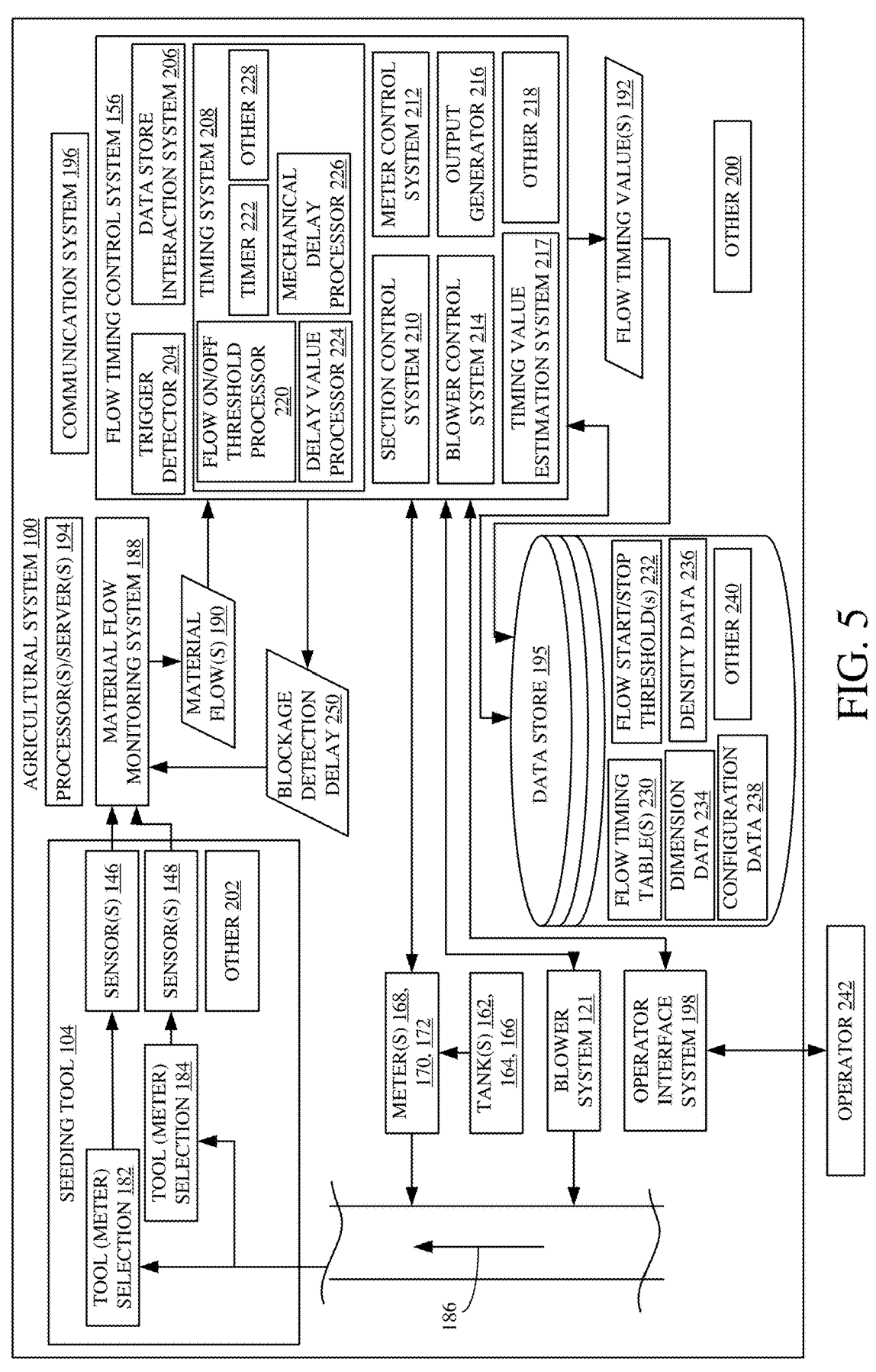
FIG. 5 is a block diagram of one example of an agricultural system.

FIG. 5 is a block diagram showing some portions of agricultural system 100 in more detail. The items in FIG. 5 that are similar to those shown in previous figures are similarly numbered. Agricultural system 100, shown in FIG. 5, thus includes seeding tool 104, one or more primary delivery tubes 132, one or more meters 168, 170, and 172, one or more tanks 162, 164, and 166, blower (or blower system) 128, one or more processors or servers 194, communication system 196, flow timing control system 156, material flow monitoring system 188, data store 195, operator interface system 198, and a wide variety of other agricultural system functionality 200. In the example shown in FIG. 5, seeding tool 104 has a plurality of different tool sections 182 and 184, sensors 146-148, and other items 202. Flow timing control system 156 can include trigger detector 204, data store interaction system 206, timing system 208, section control system 210, meter control system 212, blower control system 214, output generator 216, timing value estimation system 217, and other items 218. Timing system 208 includes flow on/off threshold processor 220, timer 222, delay value processor 224, mechanical delay processor 226, and other items 228. Data store 195 can store the flow timing values 192 in flow timing tables 230, or in other data structures. Data store 195 can also store flow on/off threshold values 232, dimension data 234, density data 236, configuration data 238, and other items 238. FIG.

5 also shows that operator 242 can interact with operator interface system 198 to control and manipulate some portions of agricultural system 100. Again, it will be appreciated that, while the items in agricultural system 100 are shown in block diagram form in FIG. 5, those items can be all located in a single machine, or distributed among a plurality of different machines, and/or distributed across the machines and a remote server environment such as in a cloud computing system.

Before describing the overall operation of architectural system 100 in identifying flow timing values in more details, a description of some of the items in agricultural system 100, and their operation, will first be provided. Communication system 196 enables communication of the items in agricultural system 100 with one another. Therefore, communication system 196 may be a controller area network (CAN) bus and bus controller, or other communication systems. Further, communication system 196 may enable communication over a network with other systems, other machines, etc. Therefore, communication system 184 may vary depending on the type of network over which it is to communicate.

Operator interface system 198 can include any of a wide variety of operator interface mechanisms and corresponding logic used to control those mechanisms. For instance, operator interface system 198 can include a steering wheel, joysticks, levers, linkages, a microphone and speakers (e.g., where speech recognition and/or speech synthesis is provided), a display screen, a touch sensitive display screen, or other items. Where a display screen is used, user actuatable input mechanisms can be displayed to display user information and receive user inputs. Those mechanisms can include such things as icons, links, buttons, etc. The mechanisms can be actuated using point and click device, touch gestures, etc. Operator interface system 198 can include any of a wide variety of other audio, visual, and/or haptic output/input devices.

Agricultural system 100, in FIG. 5, shows that seeding tool 104 has a plurality of different tool sections 182-184. As described above with respect to FIG. 4, flow of material through the primary delivery tubes 132 to each of the seeding sections 182-184 may be independently controllable (such as by controlling the meters that dispense material to those primary delivery tubes 132). Therefore, in one example, seed can be delivered to both tool sections 182 and 184 or to one tool section 182 and not to another tool section 184, or vice versa. Also, while two sections 182 and 184 are shown in FIG. 5, it will be appreciated that the seeding tool 104 can be divided into any number N of independently controllable sections. Also, while a single primary delivery tube 132 is shown, it will be appreciated that multiple primary delivery tubes 132 can be used to provide material from tanks 162, 164, and 166 to the distributing manifolds 136-1 to 136-6 on the different tool sections 182-184.

FIG. 5 shows that blower (or blower system) 121 provides air flow in an air stream 186 through the primary delivery tubes 132. Meters 168, 170, and 172 meter or dispense material from tanks 162, 164, and 166 into one or more of the primary delivery tubes 132, where that material is carried by air stream 186 to the different tool sections 182-184. Sensors 146-148 sense whether material is being delivered through the tool sections 182-184 and provide an output indicative of whether material is flowing through those tool sections. The sensor signals may be provided to seed flow monitoring system 188. Material flow monitoring system 188 generates an output 190 indicating whether material is flowing, based on the sensor signals from sensors 146-148. Material flow monitoring system 188 can also identify characteristics of the material flow (such as volume, mass flow, etc.) and output the information as material flow information 190. Based on the timing of when meters 168, 170, and 172 are activated or deactivated, and when the sensors 146-148 indicate the presence of material, flow timing control system 156 identifies flow timing values 192 that can be stored in data store 195. The flow timing values 192 can also be used to control meters 168, 170, and 172 to perform section control, or to turn on and off the flow of material, as desired.

Material flow monitoring system 188 can also identify whether a blockage occurs in the material delivery system. For instance, once a meter 168, 170, or 172 is activated, then the corresponding sensors 146-148 should provide a signal indicating that material is flowing after a delay time required by the material to travel from the meter to the sensor, after the corresponding meter is activated. This may be referred to as the turn on delay. If, after the turn on delay, the sensor does not provide an output indicating that material is flowing, then material flow monitoring system 188 can generate an output indicating that a blockage has occurred in the material delivery system.

Flow timing control system 156 uses trigger detector 204 to detect when flow timing values 192 are to be detected. The flow timing values 192 can be the turn on delay values and the turn off delay values. As discussed above, the turn on delay values are indicative of the delay between when one or more of the meters 168, 170, and 172 are activated to meter material from tanks 162, 164, and 166 into a primary delivery tube 132, and when that material is detected by one or more of the sensors 146-148. The turn off delay values are indicative of the delay between when one or more of the meters 168, 170, and 172 are deactivated to stop dispensing material into the primary delivery tube and when that material stops flowing as indicated by the sensor signals from sensors 146-148.

There may be flow threshold values that indicate when material flow is present and when material flow is not present. For instance, where sensors 146-148 provide an output indicative of the quantity of material flow (such as counts per second, units per second, impact intensity, etc.), then it may be desirable to have the flow timing values 192 be based on when the material flow crosses a threshold. As an example, the turn on delay may be calculated based on the delay between when a meter 168 is activated and when the corresponding sensor 146 senses that the flow of material has reached 90% of its desired or expected flow rate. The turn off delay value may be calculated by determining the delay between when a meter 168 is deactivated and when the sensor 146 detects that the flow of material is below 10% of the flow rate when the meter is on. These are just examples of flow on/off thresholds 232 and any of a wide variety of other thresholds can be used as well.

Therefore, in order to determine flow timing values 192, data store interaction system 206 can interact with data store 195 to obtain any flow on/off thresholds 232 that are to be used in calculating flow timing values 192. Then, timing system 208 calculates the turn on delay values and the turn off delay values and uses data store interaction system 206 to store those values as flow timing values 192 in a flow timing table 230 (or other data structure) so that they can be accessed by other control systems or other functionalities that will use those delay values in performing control operations. For instance, section control system 210 may use the turn on delay values and turn off delay values in performing section control (e.g., in turning on and off the flow of material to the different tool sections 182-184).

Meter control system 212 may use the delay values in determining when to turn on meters 168, 170, and 172 and when to turn those meters off (such as when the machine 102 is approaching a headland turn and when it has completed the headland turn and is reengaging the field, etc.). Material flow monitoring system 188 can use the turn on and turn off delays to determine when a blockage occurs. For instance, if material flow monitoring system 188 is expecting to see material flow after a particular turn on delay, but it does not see that material flow (as indicated by the sensor signals from the corresponding sensors 146-148) then system 188 can generate an output indicating that a material blockage is present in the material delivery system.

In accordance with one example, in order to detect the flow timing values 192, flow on/off threshold processor 220 accesses the flow on/off thresholds 232 and generates an output to meter control system 212 to activate one or more of the meters 168, 170, and 172 (for the sake of this example, it will be assumed that meter 168 is activated). Flow on/off threshold processor 220 also starts timer 222. Based upon the material flow signal 190 from material flow monitoring system 188, flow on/off threshold processor 220 determines whether the flow on threshold has been met. When that occurs, processor 220 generates an output to delay value processor 224 indicating that the flow on threshold has been met. Delay value processor 224 accesses the timer value output by timer 222 to identify the delay time period between when the meter 168 was activated and when the corresponding sensor 146 sensed that a threshold amount of material was flowing through the delivery system. Delay value processor 222 can generate an output of the delay as the turn on delay value.

Once the turn on delay is identified, processor 220 may use meter control system 212 to stop meter 168 and then determine when material flow drops below the flow off threshold. Delay value processor 224 detects the time between when meter 168 is deactivated and when the flow has turned off (e.g., dropped below the flow of threshold), as indicated by the output of timer 222. Delay value processor 222 generates an output indicative of this delay as the turn off delay value.

Mechanical delay processor 226 can also be used to separately identify mechanical delays, such as delays between when a meter 168, 170, or 172 is activated and when it actually begins metering out or dispensing material into delivery tube 132. Mechanical delay processor 226 may receive a signal indicative of when the meter is activated, and a sensor signal from a sensor at the output end of the meter indicating when material is being metered. Mechanical delay processor 226 can use timer 222 to time that delay or detect the mechanical delay in other ways as well.

Output generator 216 can generate an output indicative of the flow timing values 192. That output can be provided to material flow monitoring system 188 as a blockage detection delay 250, or in other ways. Output generator 216 can provide the flow timing values directly to the various control systems 210, 212, 214, etc., or provide them to data store 195 using data store interaction system 206 to store the values in flow timing tables 230 (one example of which is described elsewhere herein).

It will also be noted that, in some examples, the agricultural system 100 may not have sensors 146-148, or other mechanisms that are needed to detect the flow timing values 192. In that case, timing value estimation system 217 can obtain data such as machine dimension data 234, material density data 236, machine configuration data 238, and any of a wide variety of other information and estimate the flow timing values 192. At any point, operator 242 can also enter manually detected flow timing values which can be used by timing value estimation system 217 to correct the timing value estimations.

Figure 6A:
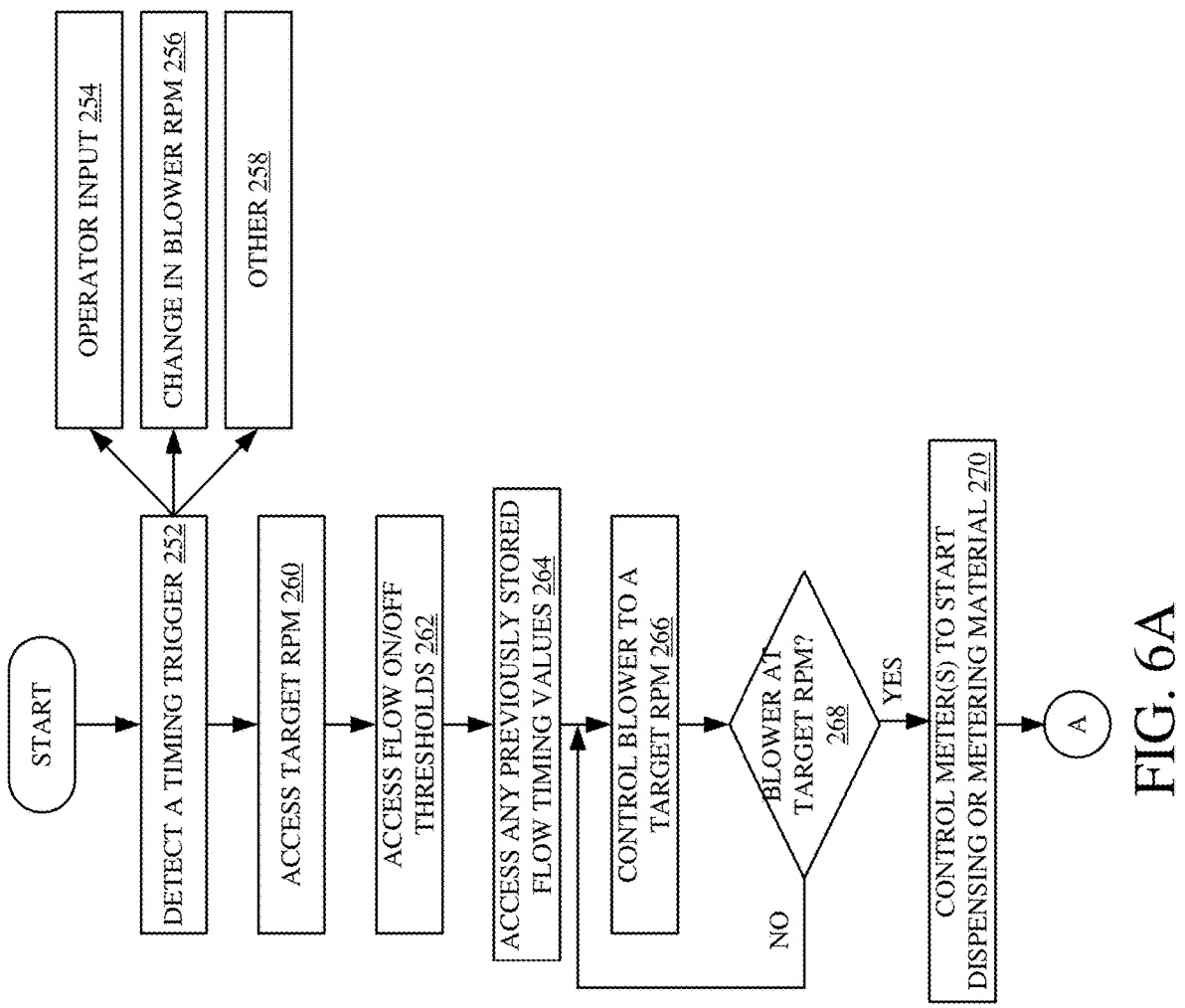
FIGS. 6A, 6B, and 6C (collectively referred to herein as FIG. 6) show a flow diagram illustrating one example of the operation of the agricultural system.
Figure 6B:
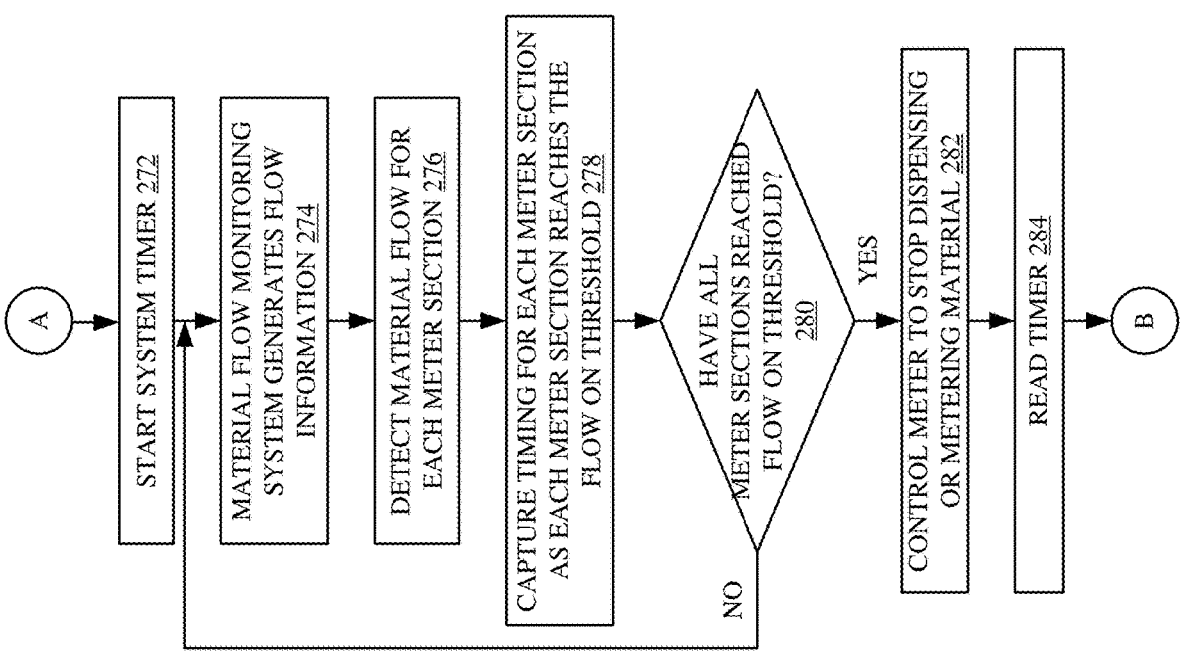
Figure 6C:
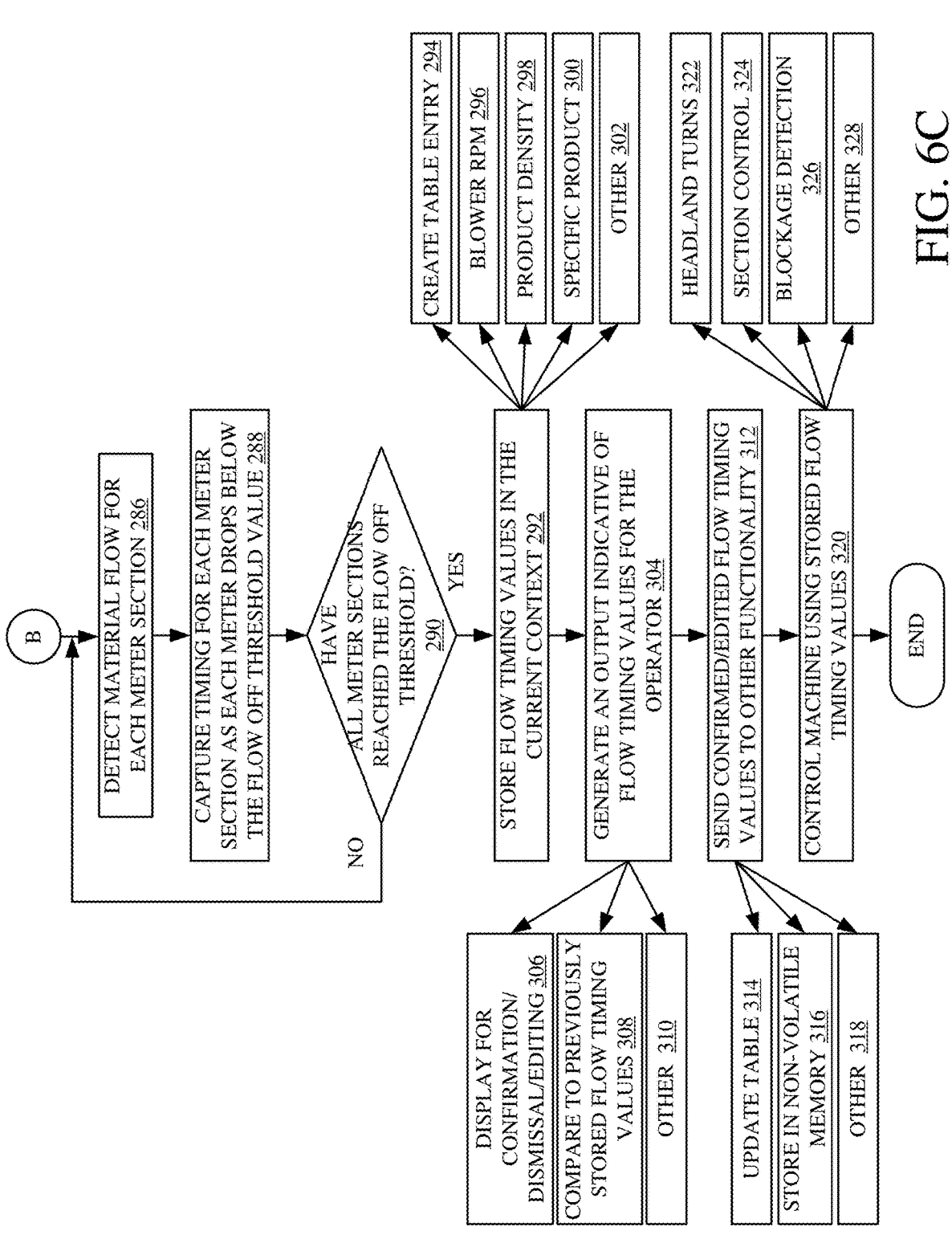

FIGS. 6A, 6B, and 6C (collectively referred to herein as FIG. 6) show a flow diagram illustrating one example of the operation of agricultural system 100 in calculating flow timing values 192 and using those values for machine control. It is first assumed that trigger detector 204 detects a timing trigger indicating that flow timing control system 156 should detect and output the flow timing values 192. Detecting a timing trigger is indicated by block 252 in the flow diagram of FIG. 6. Trigger detector 204 can detect the timing trigger as an operator input 254 from operator 242 through operator interface system 198. In one example, the flow timing values 192 may change as the speed of the blower in blower system 121 is changed. Therefore, if blower control system 214 commands a change in the blower revolutions per minute (RPMs), then trigger detector 204 may detect this as a timing trigger, as indicated by block 256. Trigger detector 204 can detect any of a wide variety of other timing triggers 258 as well.

Blower control system 214 then accesses a target speed for blower system 121, as indicated by block 260 in the flow diagram of FIG. 6. The target blower speed can be received through operator interface system 198, accessed from data store 195, or obtained in other ways. Flow on/off threshold processor 220 accesses the flow on/off (or flow start/stop) thresholds 232 from data store 195 to determine when material flow is established, and when it is stopped. Accessing the flow start/stop thresholds is indicated by block 262 in the flow diagram of FIG. 6. Timing system 208 can also access any previously stored flow timing values 192, such as from flow timing tables 230 or elsewhere. Accessing the previous flow timing values is indicated by block 264 in the flow diagram of FIG. 6.

Blower control system 214 then generates a control signal to control blower system 121 to the target speed (or target RPM). Controlling the blower to the target RPM is indicated by block 266 in the flow diagram of FIG. 6. When the blower has reached the target speed, as indicated by block 268, then meter control system 212 generates a control signal to control one or more of the meters 168, 170, and 172 to start dispensing or metering material, as indicated by block 270. Delay value processor 224 then starts timer 222, as indicated by block 272. Material flow monitoring system 188 generates material flow information 190 indicative of the level of material flow sensed by one or more of the sensors 146-148. Generating the flow information 190 is indicated by block 274 in the flow diagram of FIG. 6. Flow on/off threshold processor 220 detects material flow for each meter section (each tool section 182-184 served by a different meter 168, 170, and/or 172) as indicated by block 276. Flow on/off threshold processor 220 determines when each of the sections has material flow which meets the flow on threshold 232. Flow on/off threshold processor 220 generates an output signal to delay value processor 224 indicating when the flow on threshold 232 has been met for a given meter section. Delay value processor 224 then accesses the timer value of timer 222 to capture timing for each meter section, as each meter section reaches the flow on threshold 232. Capturing the timing is indicated by block 278 in the flow diagram of FIG. 6. The timing value will indicate the time delay between when a meter is activated and when the material is flowing, at a threshold flow value, through the corresponding tool section (as detected by the corresponding sensor 146-148). Until all of the meter sections have reached the flow on threshold value, as determined at block 280 in the flow diagram of FIG. 6, processing reverts to block 274 where material flow monitoring system 188 continues to generate material flow information 190 and the turn on delay for the different sections (or meters) is detected.

Once all of the meter sections have reached the flow on threshold, and all of the turn on delays have been detected, processing continues at block 282 where meter control system 212 generates a control signal to control the meter(s) to stop dispensing or metering material. Delay value processor 224 then reads the timer value on timer 222, as indicated by block 284 in the flow diagram of FIG. 6. Material flow monitoring system 188 detects the material flow for each meter section 182-184, and flow on/off threshold processor 220 determines when the flow through each meter section has dropped below the flow off threshold value. Detecting the material flow for each meter section is indicated by block 286 in the flow diagram of FIG. 6. When the flow through a particular meter section has dropped below the flow off threshold value, then flow on/off threshold processor 220 generates an output indicative of this to delay value processor 224. Delay value processor 224 then reads the value on timer 222 to determine the turn off delay time for each meter section, as material flow through each meter section drops below the flow off threshold value. Capturing the turn off timing information to determine the turn off delay is indicated by block 288 in the flow diagram of FIG. 6. Until the flow through all of the meter sections has dropped below the flow off threshold, as determined at block 290, processing reverts to block 286 where the material flow for each meter section is monitored and the timing information is captured.

Once all of the turn on delay values and the turn off delay values have been captured, output generator 216 generates an output of those values as the flow timing values 192. The flow timing values 192 can be sent to the various control systems 210, 212, 214, where they are stored, or they can be stored in data store 195 for access by those control systems, or other control systems.

The flow timing values 192 are stored based on current context information so that they can be recalled in the appropriate context, for later control. Storing the flow timing values in the current context is indicated by block 292 in the flow diagram of FIG. 6. For instance, data store interaction system 206 can create a flow timing table 230 to store the flow timing values 192 along with the appropriate context information. Once the flow timing table 230 is created, data store interaction system 206 can generate an entry in table 230 with the flow timing values 192 and the corresponding context information. Creating a table entry to store the flow timing values 192 is indicated by block 294 in the flow diagram of FIG. 6. The context information that can be stored along with the flow timing values can include the blower RPM 296, the product density 298, a specific product identifier 300, the configuration (which may identify blower technology being used, etc.), or any of a wide variety of other context information 302.

Table 1, shows one example of a portion of a flow timing table 230. Table 1 can be indexed by blower RPM or other blower speed indicator 330. The blower speed 330 can be used as an indicator of the velocity of the air stream 186 to determine the flow timing values 338. It will be appreciated that air speed sensors can also be used to sense the velocity of air stream 186 as well. The table 230 can also be indexed by, or include, target flow rate 332. The table 230 can include product density 334, a specific product identifier 336, the flow timing values 338 (such as the turn on delay and the turn off delay, and any other flow timing values, such as mechanical delay values), and a wide variety of other information 340.

TABLE 1

| BLOWER RPM 330 |
| TARGET FLOW RATE 332 |
| PRODUCT DENSITY 334 |
| SPECIFIC PRODUCT IDENTIFIER 336 |
| FLOW TIMING VALUES 338 |
| OTHER 340 |

Output generator 216 can also generate an output indicative of the flow timing values 192 for output to operator 242 using operator interface system 198. Generating an output for the operator is indicated by block 304 in the flow diagram of FIG. 6. In one example, the flow timing values 192 can be displayed to operator 242 so that operator 242 can confirm those values, dismiss them, edit them, or otherwise interact with them, as indicated by block 306. In another example, output generator 216 can retrieve any prior flow timing values 192 that were detected and display the prior flow timing values 192 with the currently detected flow timing values 192. Comparing the previously stored flow timing values to the current flow timing values on an output for operator 242 is indicated by block 308 in the flow diagram of FIG. 6. Output generator 216 can generate an output with the flow timing values 192 for the operator in other ways as well, as indicated by block 310.

Output generator 216 can also send the confirmed or edited flow timing values 192 to other functionality in agricultural system 100 for use in controlling the agricultural machine, as indicated by block 312 in the flow diagram of FIG. 6. For instance, edited flow timing values can be output for storage in flow timing table 230 to update that table, as indicated by block 314. The flow timing values 192 can be stored in non-volatile memory in each of the section control systems 210, 212, 214, or other systems (such as system 188 or other systems), as indicated by block 316. The output generator 216 can output the flow timing values in other ways as well, such as by using communication system 196 to communicate the flow timing values to another machine, another computer system, or elsewhere, over a network, as indicated by block 318.

The various control systems in agricultural system 100 can then control the machine using the stored flow timing values, as indicated by block 320. For instance, meter control system 212 can control meters 168, 170, and 172 during headland turns to prevent overseeding, and gaps as indicated by block 322. Section control system 210 can control the meters 168, 170, and 172 serving the various tool or meter sections 182-184 to perform section control, as indicated by block 324. The timing control values can be output to material flow monitoring system 188 for use in determining whether there is a blockage in the material delivery system, as indicated by block 326. The flow timing values 192 can be used in a wide variety of other ways to control other functionalities on the machine as well, as indicated by block 328.

Figure 7:
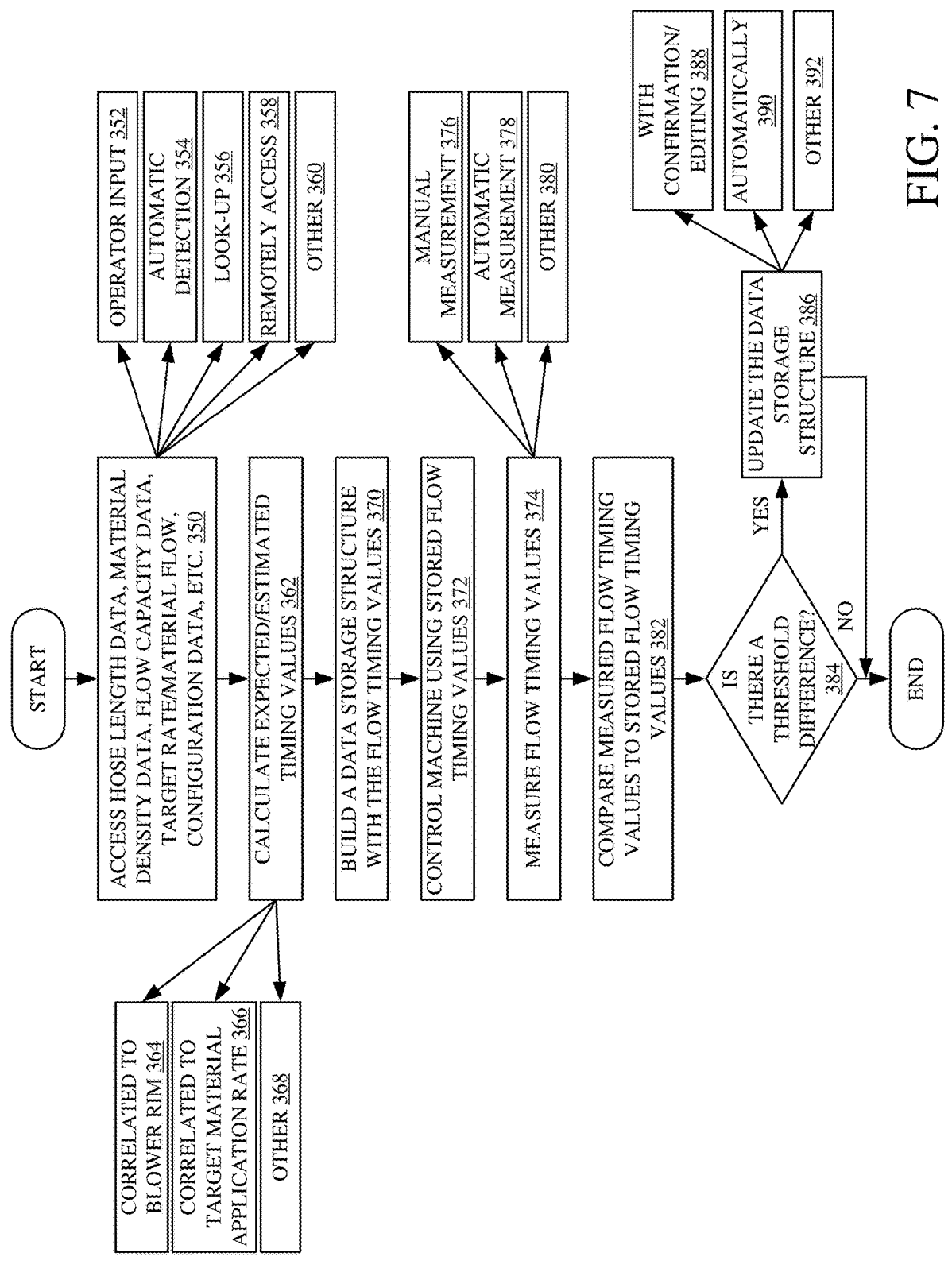
FIG. 7 is a flow diagram showing one example of the operation of the agricultural system.

As noted above, it may be that the agricultural system 100 does not have material flow sensors 146-148 or other components that are needed to automatically detect the flow timing values 192. In that case, timing value estimation system 217 can access a variety of different information and generate estimated flow timing values that can be stored and used for machine control. FIG. 7 shows one example of a flow diagram illustrating the operation of timing value estimation system 217 in generating the estimated flow timing values 192.

System 217 first accesses a number of items of data, such as hose length data indicating the length of primary delivery tubes 132 and/or secondary lines 138, material density data indicative of the density of the material being delivered or applied, flow capacity data indicative of the capacity of the delivery system to deliver the material (e.g., the speed of blower system 121, the size of the tubes, etc.), as well as the target rate of material flow (which may determine the blower speed, the metering rate, etc.), configuration data, such as the type of blower technology being used or other configuration data. Accessing these types of data are indicated by block 350 in the flow diagram of FIG. 7. The data can be entered by operator 242 as an operator input 352, or may be automatically detected by various detectors as indicated by block 354. The data can be looked up from data store 195, as indicated by block 356 or accessed remotely (such as from a cloud computing system or other remote server environment), as indicated by block 358. The data can be accessed in a wide variety of other ways as well, as indicated by block 360. Using the data, timing value estimation system 217 calculates expected or estimated flow timing values 192. Calculating these values is indicated by block 362 in the flow diagram of FIG. 7. System 217 can calculate different estimated flow timing values 192 correlated to different blower speeds, as indicated by block 364, so that when blower system 121 is set to a given speed, the flow timing values 192 corresponding to that blower speed can be retrieved. Timing value estimation system 217 can also generate values correlated to different material application rates, as indicated by block 366, or in a wide variety of other ways, as indicated by block 368.

System 217 can then control data storage interaction system 206 to build a flow timing table 230 (or another data storage structure) and store the estimated or predicted flow timing values 192 in that data structure. Building the storage data structure and storing the values is indicated by block 370 in the flow diagram of FIG. 7. The machine is then controlled using the stored flow timing values, as indicated by block 372 in the flow diagram of FIG. 7.

At any point, the flow timing values 192 can be measured, as indicated by block 374. For instance, the operator 242 can perform a manual measurement of the flow timing values, or a subset of those values, as indicated by block 376. The values can also be automatically measured, such as where sensors 146-148 are added or the machine is otherwise enabled with automatic measurement. Measuring the flow timing values 192 automatically is indicated by block 378 in the flow diagram of FIG. 7. The flow timing values can be measured in other ways as well, as indicated by block 380.

Timing value estimation system 217 can then compare the measured flow timing values to the stored, estimated flow timing values, as indicated by block 382. If there is a threshold difference between the measured and estimated flow timing values, as determined at block 384, then timing value estimation system 217 can use data store interaction system 206 to update the data storage structure to include the measured flow timing values. Updating the data storage structure is indicated by block 386 in the flow diagram of FIG. 7. The update can also be displayed using operator interface system 198 to operator 242 for confirmation or editing, as indicated by block 388. In another example, the measured values can automatically replace the estimated values, without confirmation or editing, as indicated by block 390. The data structure can be updated in other ways as well, as indicated by block 392.

Figures 8A, 8B, 8C, 8D:
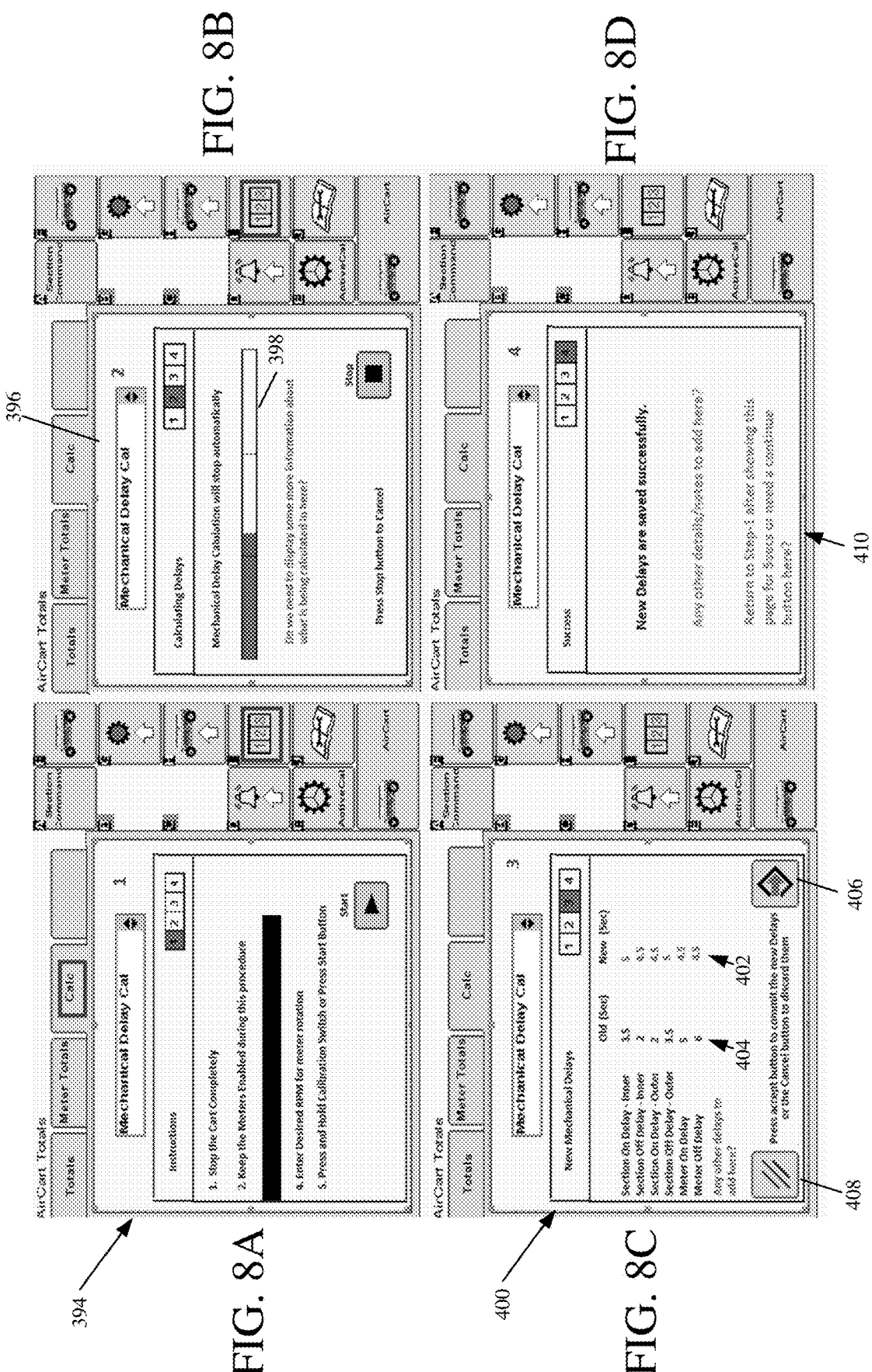
FIGS. 8A, 8B, 8C and 8D show examples of operator interfaces.

FIGS. 8A-8D show examples of user interface displays that can be generated during the operation of agricultural system 100 while detecting the flow timing values 192. FIG. 8A, for instance, shows a user interface display 394 which is an instructional display generated on operator interface system 198 for operator 242. The instructional display 394 displays instructions for performing the calibration operation in which flow timing values 192 are automatically detected.

FIG. 8B shows a display 396 that can be generated by flow timing control system 156 or operator interface system 198 during the calibration operation in which flow timing values 192 are detected. FIG. 8B can, for instance, show a status bar 398 that indicates the progress of the delay calibration being performed.

FIG. 8C shows one example of a display 400 that illustrates the flow timing values 192 for different sections of the seeding tool 104, as well as the mechanical delays in turning on and off the meters. In the example shown in FIG. 8C, the new flow timing values 192 that have just been calculated are displayed generally at 402. In addition, the old flow timing values 192 that were perhaps detected during a prior calibration operation, are also displayed generally at 404. Therefore, operator 242 can quickly see how the new flow timing values compare to the old flow timing values and determine whether to accept, dismiss, or edit the new flow timing values. A user input mechanism 406 is also displayed, which allows the user to accept the new values so that they are stored in data store 195. Another user input mechanism 408 can be actuated by the operator to discard the new flow timing values, so that the system maintains the old flow timing values. FIG. 8D shows another example of an operator interface display 410 that can be generated to indicate that the flow timing values have been successfully saved and can now be used to control the agricultural machine.

It can thus be seen that the present description describes a system which can automatically detect flow timing values for different sections of a seeding tool, for different meters located at different distances from the seeding tool, for different delivery hose lengths, for different blower speeds, material densities, etc. The detection can be performed automatically so that the operator need not perform manual timing operations. Similarly, the present system can use a timing value estimation system to estimate the flow timing values.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface displays have been discussed. The displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generators, and/or logic. It will be appreciated that such systems, components and/or logic can be comprised of hardware items (such as processors and associated memory, or other processing components, some of which are described below) that perform the functions associated with those systems, components, generators, and/or logic. In addition, the systems, components, generators, and/or logic can be comprised of software that is loaded into a memory and is subsequently executed by a processor or server, or other computing component, as described below. The systems, components, generators, and/or logic can also be comprised of different combinations of hardware, software, firmware, etc., some examples of which are described below. These are only some examples of different structures that can be used to form the systems, components, generators, and/or logic described above. Other structures can be used as well.

Figure 9:
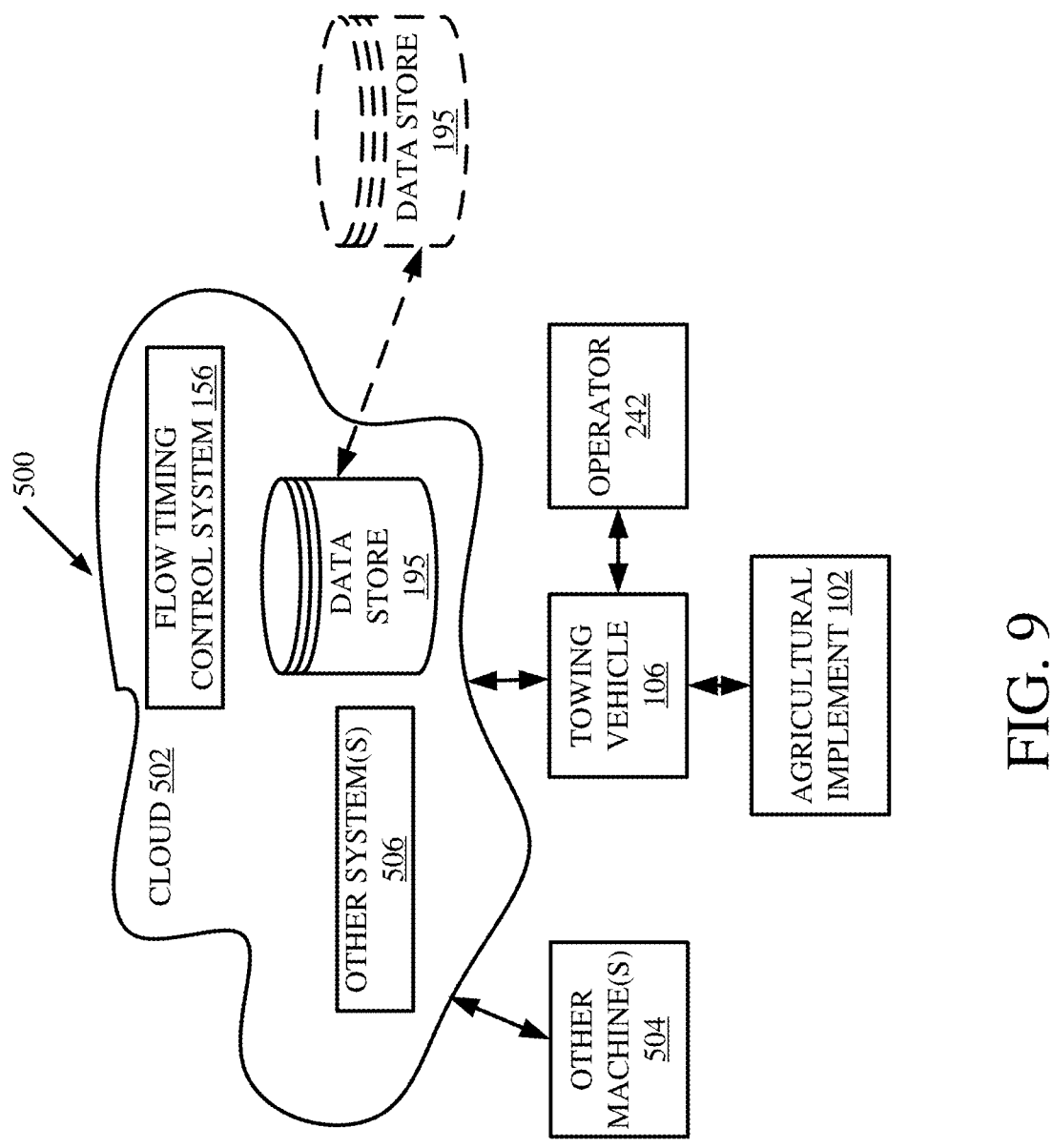
FIG. 9 is a block diagram of one example of a remote server architecture.

FIG. 9 is a block diagram of system 100, shown in FIGS. 1-5, except that system 100 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 9, some items are similar to those shown in previous FIGS. and they are similarly numbered. FIG. 9 specifically shows that system 156 and data store 195, as well as other systems 566 can be located at a remote server location 502. Therefore, system 100 accesses those systems through remote server location 502. FIG. 9 also shows that other machines 504 can also communicate with the items in cloud 502 and with vehicle 106 through cloud 502.

FIG. 9 also depicts another example of a remote server architecture. FIG. 9 shows that it is also contemplated that some elements of previous FIGS are disposed at remote server location 502 while others are not. By way of example, data store 195 can be disposed at a location separate from location 502, and accessed through the remote server at location 502. Regardless of where the items are located, the items can be accessed directly by system 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the tractor comes close to the fuel truck for fueling, the system automatically collects the information from the tractor using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the tractor until the tractor enters a covered location. The tractor, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
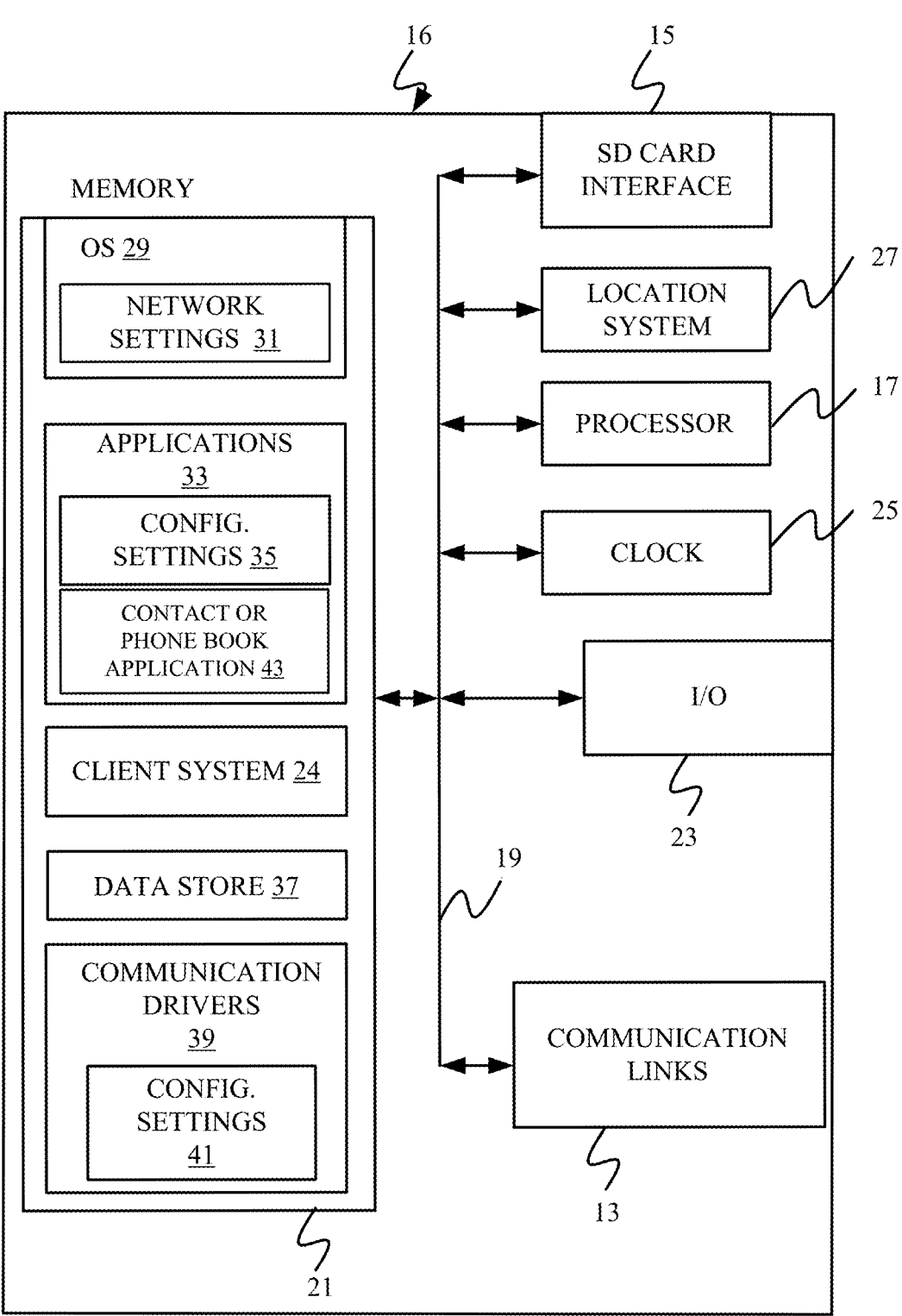
FIGS. 10-12 show examples of mobile devices that can be used in the systems and architectures shown in the previous FIGS.
Figure 11:
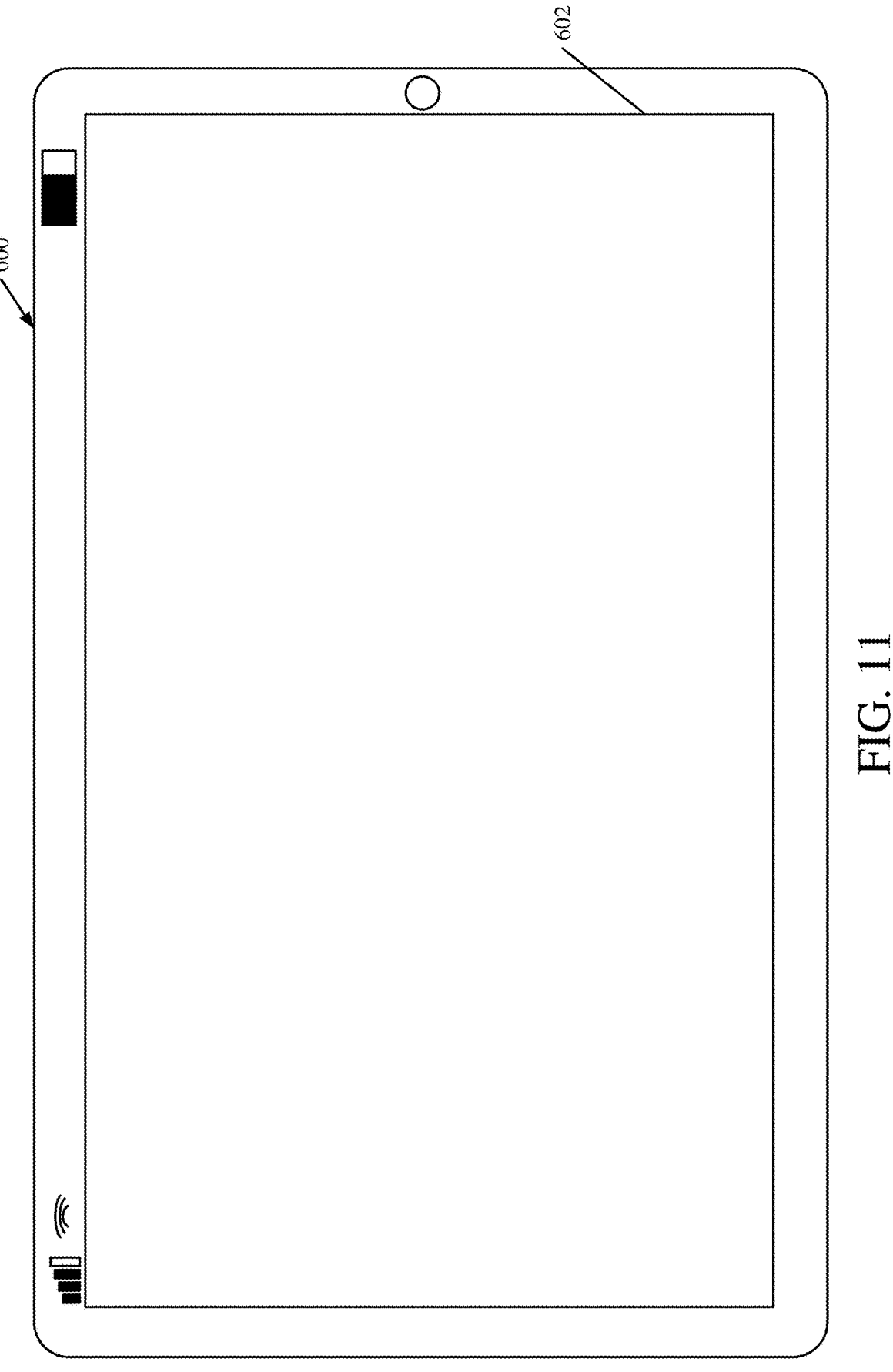
Figure 12:
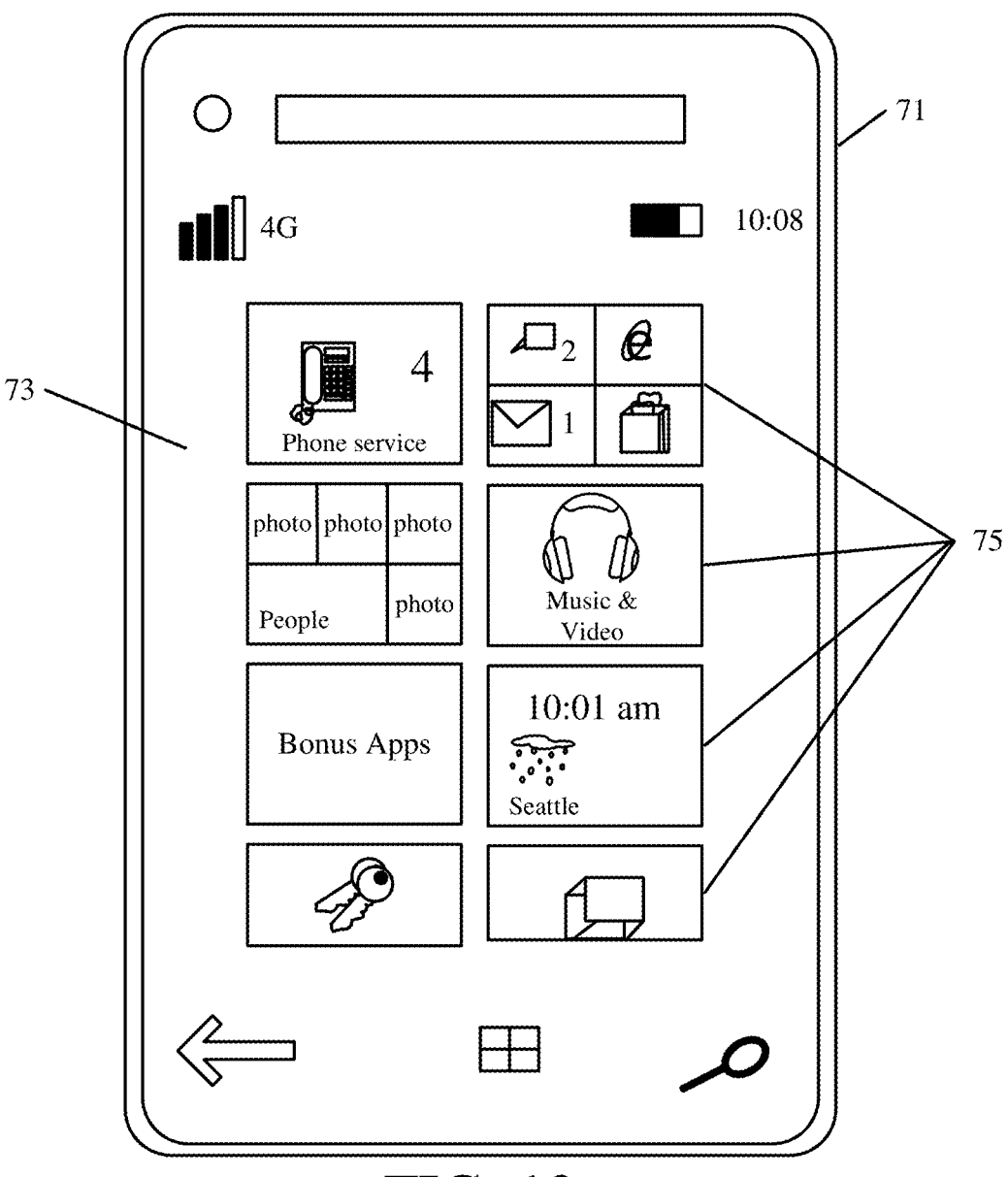

FIG. 10 is a simplified block diagram of one illustrative example of a handheld or mobile computing device that can be used as a user's or client's hand held device 16, in which the present system (or parts of it) can be deployed. For instance, a mobile device can be deployed in the operator compartment of tractor 106 for use in generating, processing, or displaying the yaw rate or meter control data. FIGS. 11-12 are examples of handheld or mobile devices.

FIG. 10 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 11 shows one example in which device 16 is a tablet computer 600. In FIG. 11, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
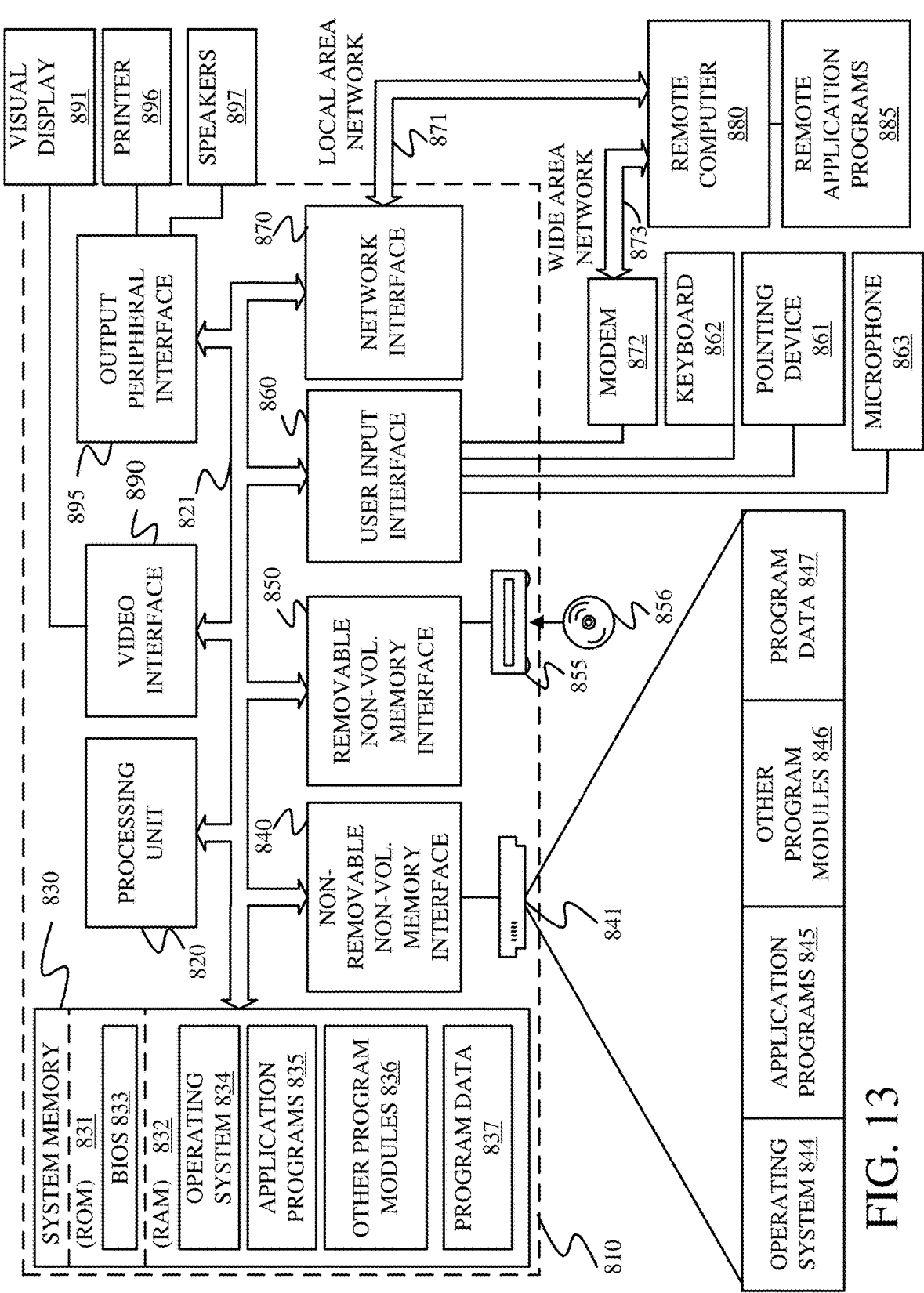
FIG. 13 is a block diagram of one example of a computing environment that can be used in the systems and architectures shown in the previous FIGS.

FIG. 13 is one example of a computing environment in which elements of previous FIGS., or parts of it, (for example) can be deployed. With reference to FIG. 13, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system, comprising:
   a material application implement;
   a material tank;
   a delivery conduit coupled to the material application implement;
   a meter configured to meter material from the material tank into the delivery conduit;
   a meter control system configured to activate the meter;
   a blower that generates airflow in the delivery conduit to carry the material from the meter through the delivery conduit to the material application implement;
   a material sensor configured to sense material flowing at the material application implement and generate a sensor signal indicative of the material;
   a material flow monitoring system configured to identify a flow characteristic of the material based on the sensor signal and generate a material flow output indicative of the flow characteristic;
   a flow timing control system configured to:
   determine whether the material flowing at the material application implement meets a flow threshold based on the material flow output;
   identify a flow start delay based on when the meter is activated by the meter control system, when the material sensor senses the material, and the material flow output indicating that the material flowing at the material application implement meets the flow threshold; and a control system configured to generate a control signal to control a portion of the agricultural system based on the flow start delay.

2. The agricultural system of claim 1 wherein the flow timing control system is configured to:

deactivate the meter; and detect a flow stop delay based on when the meter is deactivated by the meter control system and when the material sensor stops sensing the material.

3. The agricultural system of claim 2 wherein the material flow monitoring system is configured to identify a second flow characteristic of the material based on the sensor signal and generate a material flow output indicative of the second flow characteristic.

4. The agricultural system of claim 3 wherein the flow timing control system is configured to determine whether the material flowing at the material application implement meets a second flow threshold based on the material flow output.

5. The agricultural system of claim 4 wherein the flow timing control system is configured to identify the flow stop delay based on the material flow output indicating that the material flowing at the material application implement meets the second flow threshold.

6. The agricultural system of claim 1 wherein the blower is configured to operate at a plurality of different blower speeds and wherein the flow timing control system is configured to detect flow timing values corresponding each of the plurality of different blower speeds.

7. The agricultural system of claim 6 wherein the control system is configured to identify a current blower speed, access the corresponding flow timing value and generate the control signal based on the accessed flow timing value.

8. A system for controlling an agricultural material application machine that includes a material meter and a material application implement, the system comprising:

a material sensor configured to sense flow of material at the material application implement and generate a sensor signal indicative of the flow of material;

a material flow monitoring system configured to generate a flow output indicative of a characteristic of the material flow based on the sensor signal;

a flow timing control system configured to:

generate estimated time delay information corresponding to material traveling between the material meter and the material application implement through a delivery conduit;

determine when material flow of the material flowing at the material application implement meets a first flow threshold based on the flow output and generate a flow start output;

identify a flow start delay indicative of a time that the material takes to begin flowing at the material application implement, based on flow start output, after activation of the material meter to dispense the material into the delivery conduit;

determine when material flow of the material flowing at the material application implement drops below a second flow threshold based on the flow output and generate a flow stop output;

detect a flow stop delay indicative of a time that the material takes to stop flowing at the material application implement, based on flow stop output, after deactivation of the material meter to stop dispensing the material into the delivery conduit;

perform a comparison to compare the estimated time delay information to the flow start delay and the flow stop delay and update, based on the comparison, the estimated time delay information to obtain updated estimated time delay information; and a machine control system configured to generate a control signal to control the agricultural material application machine based on the updated estimated time delay information.

9. The system of claim 8 wherein the comparison comprises a determination of a threshold difference between the estimated time delay information and one or more of the flow start delay or the flow stop delay.

10. The system of claim 8 wherein the material meter is activated to dispense material into the delivery conduit and wherein the agricultural material application machine comprises:

a blower that generates airflow in the delivery conduit to carry the material from the material meter through the delivery conduit to the material application implement; and a material sensor configured to sense flow of material at the material application implement and generate a sensor signal indicative of the flow of material.

11. The system of claim 10 wherein the blower is controllable to operate at different blower speeds and wherein the flow timing control system is configured to automatically detect a time delay corresponding to material traveling between the material meter and the material application implement through the delivery conduit at the different blower speeds.

12. The system of claim 8, wherein the flow timing control system is configured to update the estimated time delay information based on a user acceptance input.

13. An agricultural system, comprising:

a material application implement;

a material tank;

a delivery conduit coupled to the material application implement;

a meter configured to meter material from the material tank into the delivery conduit;

a meter control system configured to activate the meter;

a blower that generates airflow in the delivery conduit to carry the material from the meter through the delivery conduit to the material application implement;

a material sensor configured to sense material flowing at the material application implement and generate a sensor signal indicative of the material;

a material flow monitoring system configured to identify a flow characteristic of the material based on the sensor signal and generate a material flow output indicative of the flow characteristic;

a flow timing control system configured to:

determine whether the material flowing at the material application implement meets a flow threshold based on the material flow output;

identify a flow stop delay based on when the meter is deactivated by the meter control system, when the material sensor stops sensing the material, and the material flow output indicating that the material flowing at the material application implement meets the flow threshold; and a control system configured to generate a control signal to control a portion of the agricultural system based on the flow stop delay.

14. The agricultural system of claim 13 wherein the flow timing control system is configured to detect a flow start delay based on when the meter is activated by the meter control system and when the material sensor senses the material.

15. The agricultural system of claim 14 wherein the flow timing control system is configured to determine whether the material flowing at the material application implement meets a second flow threshold based on the material flow output.

16. The agricultural system of claim 15 wherein the flow timing control system is configured to identify the flow start delay based on the material flow output indicating that the material flowing at the material application implement meets the second flow threshold.

17. The agricultural system of claim 13 wherein the blower is configured to operate at a plurality of different blower speeds and wherein the flow timing control system is configured to detect flow timing values corresponding each of the plurality of different blower speeds.

18. The agricultural system of claim 17 wherein the control system is configured to identify a current blower speed, access the corresponding flow timing value and generate the control signal based on the accessed flow timing value.

* * * * *